(12) United States Patent
Kamath et al.

(10) Patent No.: US 11,822,785 B2
(45) Date of Patent: Nov. 21, 2023

(54) MANAGING APPLICATION FOCUS TRANSITIONS

(71) Applicant: Salesforce, Inc., San Francisco, CA (US)

(72) Inventors: Divya Ramesh Kamath, San Francisco, CA (US); Todd Christopher Kloots, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/373,650

(22) Filed: Jul. 12, 2021

(65) Prior Publication Data

US 2023/0012141 A1 Jan. 12, 2023

(51) Int. Cl.
*G06F 3/04892* (2022.01)
*G06F 3/0482* (2013.01)
*H04L 12/18* (2006.01)

(52) U.S. Cl.
CPC ........ *G06F 3/04892* (2013.01); *G06F 3/0482* (2013.01); *H04L 12/1813* (2013.01)

(58) Field of Classification Search
CPC ............................ G06F 3/04892; G06F 3/0482
See application file for complete search history.

(56) References Cited

U.S. PATENT DOCUMENTS

| 7,735,023 B1 * | 6/2010 | Chadzelek | G06F 3/0489 715/767 |
| 2002/0023271 A1 * | 2/2002 | Augenbraun | G06F 3/0489 725/109 |
| 2006/0085698 A1 * | 4/2006 | Klementiev | G06F 11/3672 714/55 |
| 2014/0245205 A1 * | 8/2014 | Smith | G06F 16/51 715/767 |
| 2015/0169152 A1 * | 6/2015 | Shearer | G06F 3/0484 715/760 |
| 2015/0254225 A1 * | 9/2015 | Chirca | G06F 3/0483 715/224 |

(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Roberto Borja
(74) *Attorney, Agent, or Firm* — Lee & Hayes, P.C.

(57) ABSTRACT

Media, methods, and systems are disclosed for managing focus for an application having a plurality of application user interface components. Initially, a first user interface component receives a first keystroke. Responsive to receiving the first keystroke, the application transitions from a default or pointing device navigation mode to a managed or keyboard navigation mode. The first user interface component receives a second keystroke, and responsive thereto invokes an application focus manager to set a destination user interface component identifier. Next, a second user interface component associated with the destination user interface component identifier compares the destination user interface component identifier to its own component identifier. Finally, the second user interface component claims keyboard input focus in the application.

20 Claims, 8 Drawing Sheets

(56) References Cited

U.S. PATENT DOCUMENTS

2018/0049023 A1* 2/2018 Stuber .................. G06F 9/452
2018/0121265 A1* 5/2018 Rosnow ............... G06F 9/4488
2018/0287982 A1 10/2018 Draeger et al.

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

MANAGING APPLICATION FOCUS TRANSITIONS

TECHNICAL FIELD

Embodiments of the invention generally relate to managing focus for an application. More specifically, embodiments of the invention relate to programmatically managing keyboard focus in connection with an application such as a group-based communication system user interface.

Traditionally, users have been able to interact with graphical user interfaces via a pointing device (such as a mouse, trackball, or trackpad) or via keyboard shortcuts. For example, a user might create a new window for an existing application either by using a pointing device to first click on a "File" item in a menu bar and then clicking on a "New Window" option form the resulting menu. Alternatively, the user might use a Control+N (or Command+N) keyboard command to achieve the same result. Similarly, a user might select a focus object (i.e., the object that will receive keystrokes typed by the user) within a current window either by clicking on the desired object with the pointing device or by cycling between available focus objects using the Tab key. Users may also intermix pointing device commands and keyboard commands for different tasks or for repeated performances of the same task. Experienced users may prefer keyboard commands as being faster or requiring fewer steps. Similarly, certain users (for example, users with decreased visual acuity making use of a screen reader) may prefer keyboard commands for accessibility reasons.

However, when using dynamic applications (such as those which display network content), the increased speed of keyboard commands can be problematic if the user invokes commands faster than application content can be updated. For example, a user may use a series of commands such as first typing Control+F to open a search pane and switch keyboard focus to it, then typing a search string followed by Enter, then using the Down Arrow key to select the first search result, and then using the Enter key to navigate to a page associated with the search result. A user who employs this series of commands regularly may input them one after another without waiting for visual confirmation that each command has executed successfully before inputting the next. However, if the search process takes longer than it takes the user to enter commands, no search results may be available when the user presses the down arrow, causing that command to be lost and the Enter key interpreted as performing a new search with an empty search string. This can cause user frustration as commands are not being executed properly. Furthermore, users who utilize keyboard commands for accessibility purposes may be disoriented, as keyboard focus may not be where they expect it to be after their series of commands. As such, what is needed is a way to programmatically manage keyboard focus in such a way that applications execute keyboard commands correctly even when a destination object is not yet instantiated or is otherwise unready to receive keyboard input.

SUMMARY

Embodiments of the invention address the above-identified need by providing mechanisms for programmatically managing keyboard focus in dynamic applications. In particular, in a first embodiment, the invention includes One or more non-transitory computer-readable media storing computer-executable instructions that, when executed by a processor, perform a method of managing focus for an application comprising a plurality of application user interface components, the method comprising receiving, by a first user interface component in the plurality of application user interface components, a first keystroke in a predefined set of navigation keystrokes, responsive to receiving the first keystroke, transitioning from a pointing device navigation mode to a keyboard navigation mode, receiving, by the first user interface component, a second keystroke in the predefined set of navigation keystrokes, responsive to receiving the second keystroke, invoking an application focus manager to set a destination user interface component identifier, invoking, by a second user interface component, the application focus manager to retrieve the destination user interface component identifier, and responsive to determining that the destination user interface component identifier matches a user interface component identifier associated with the second user interface component, claiming, by the second user interface component, keyboard input focus for the application.

In a second embodiment, the invention includes a method of managing focus for an application comprising a plurality of application user interface components, the method comprising receiving, by a first user interface component in the plurality of application user interface components, a first keystroke in a predefined set of navigation keystrokes, responsive to receiving the first keystroke, transitioning from a pointing device navigation mode to a keyboard navigation mode, receiving, by the first user interface component, a second keystroke in the predefined set of navigation keystrokes, responsive to receiving the second keystroke, invoking an application focus manager to set a destination user interface component identifier, invoking, by a second user interface component, the application focus manager to retrieve the destination user interface component identifier; and responsive to determining that the destination user interface component identifier matches a user interface component identifier associated with the second user interface component, claiming, by the second user interface component, keyboard input focus for the application.

In a third embodiment, the invention includes system comprising at least one processor and at least one non-transitory memory storing computer executable instructions that when executed by the processor cause the system to carry out actions comprising, receiving, by a first user interface component in the plurality of application user interface components, a first keystroke in a predefined set of navigation keystrokes, responsive to receiving the first keystroke, transitioning from a pointing device navigation mode to a keyboard navigation mode, receiving, by the first user interface component, a second keystroke in the predefined set of navigation keystrokes, responsive to receiving the second keystroke, invoking an application focus manager to set a destination user interface component identifier, invoking, by a second user interface component, the application focus manager to retrieve the destination user interface component identifier, and responsive to determining that the destination user interface component identifier matches a user interface component identifier associated with the second user interface component, claiming, by the second user interface component, keyboard input focus for the application.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
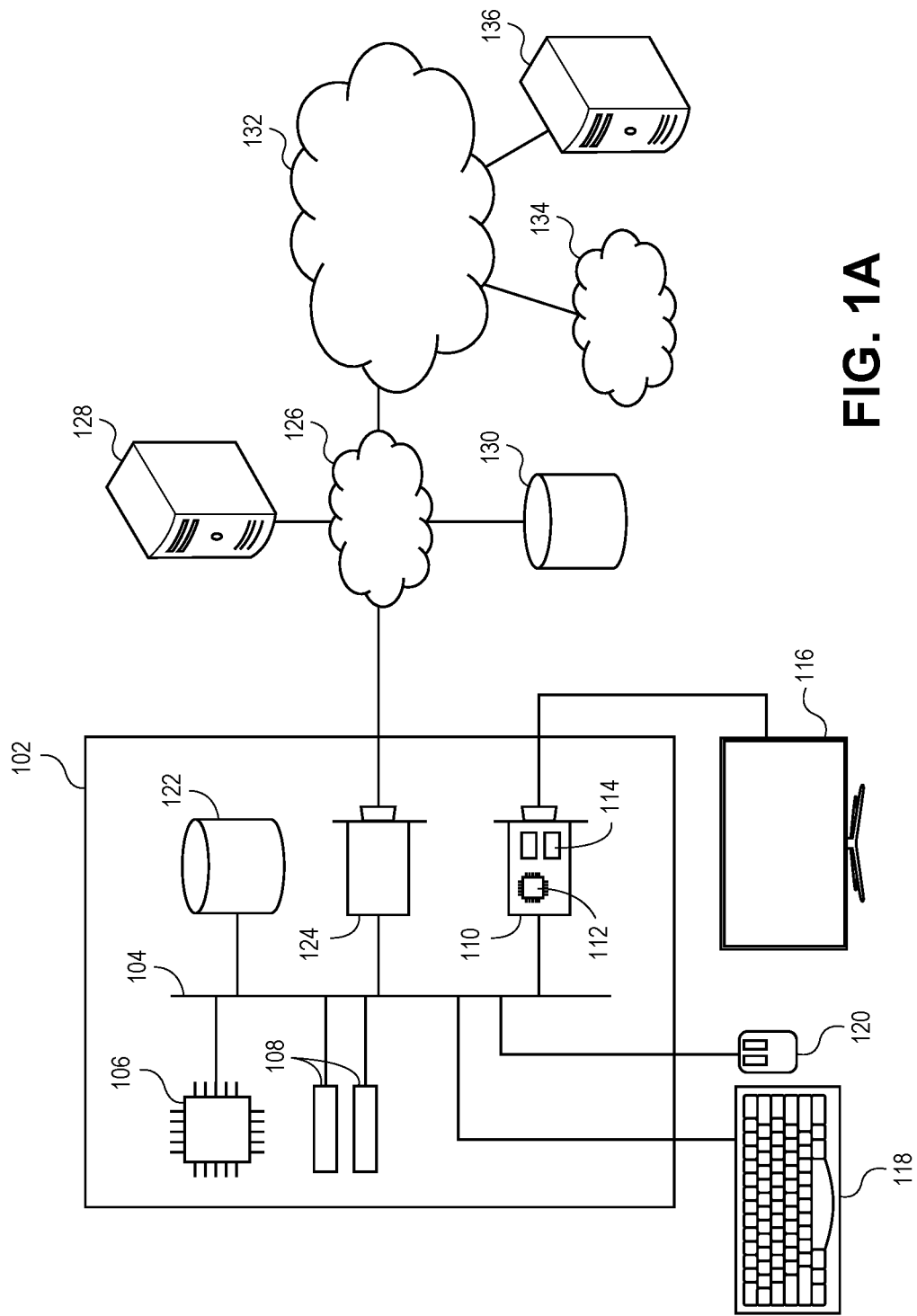
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email or SMS messaging system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
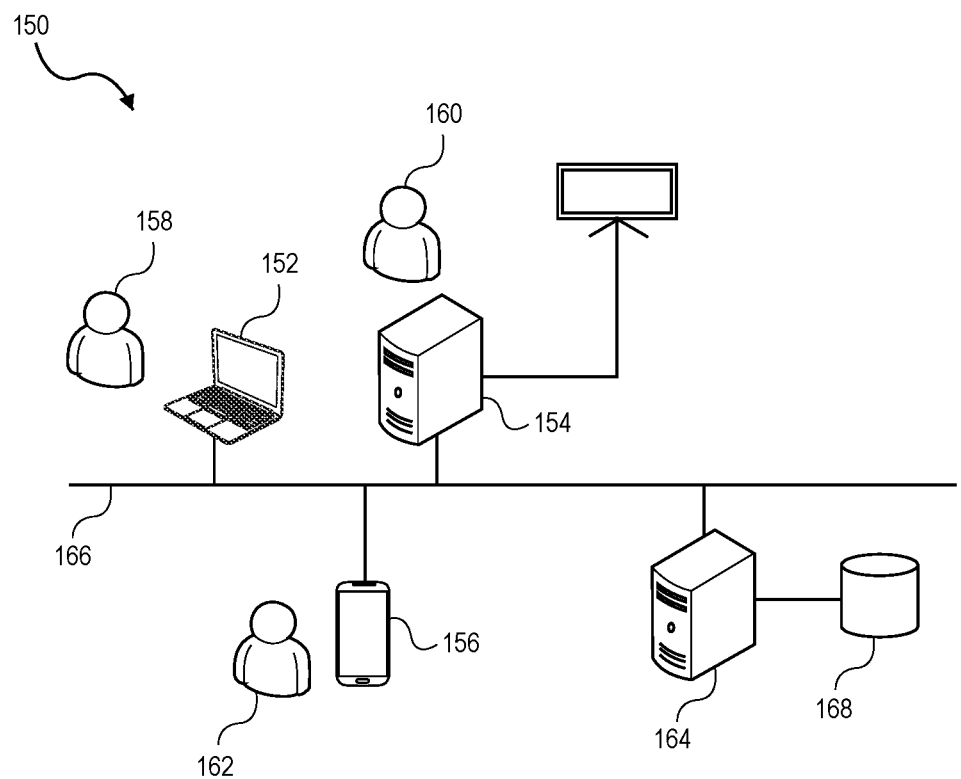
FIG. 1B illustrates elements of a system for carrying out embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively or in addition, in any of these embodiments, data may be sharded across multiple group-based communication system data stores.

Figure 2A:
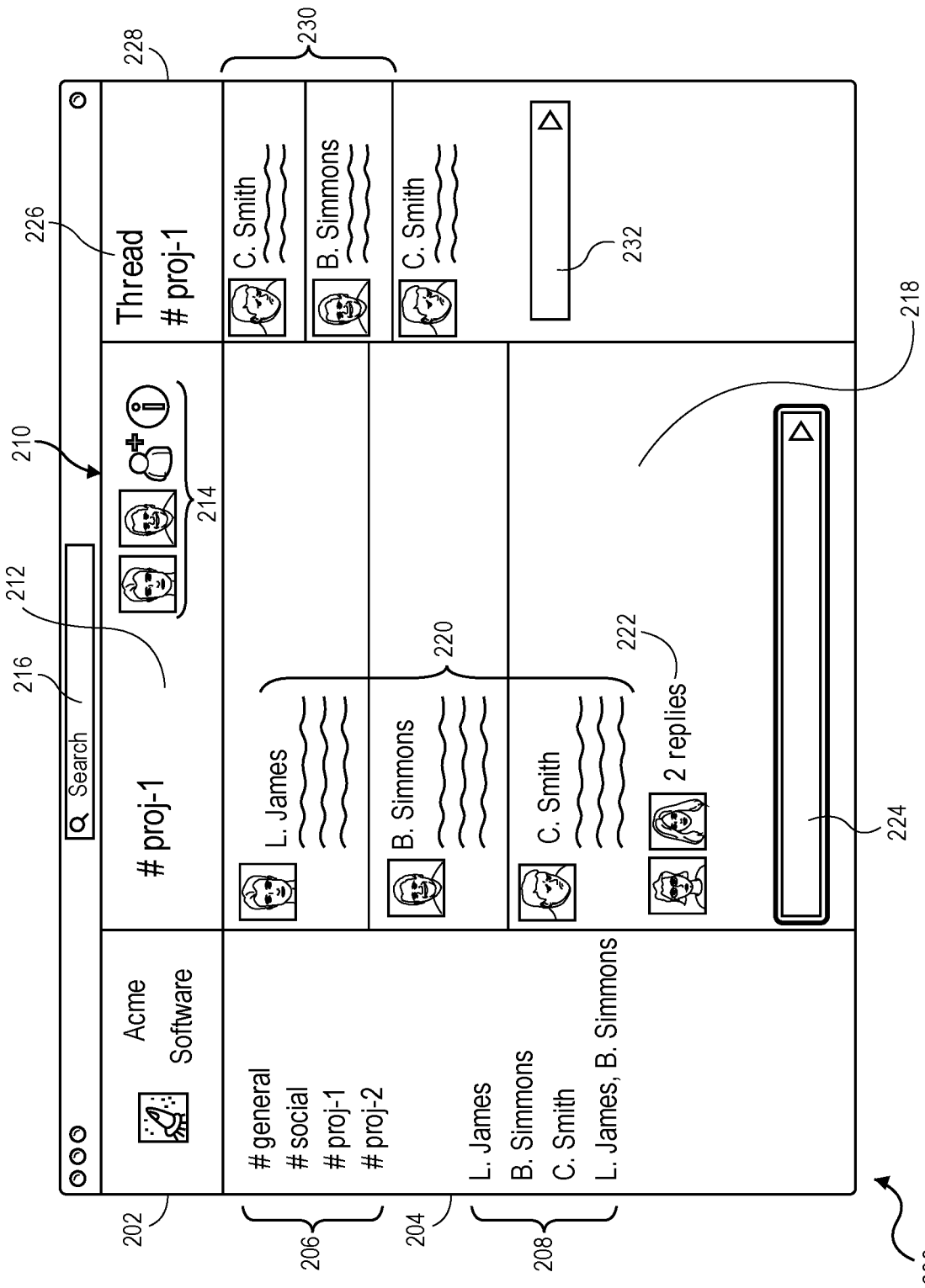
FIG. 2A depicts a representative user interface of a group-based communication system.

FIG. 2A depicts a representative user interface of a group-based communication system, which will be useful in illustrating the operation of various embodiments of the inventions, as discussed in further detail below. Broadly speaking, user interface 200 comprises a plurality of objects such as panes, text entry fields, buttons, messages, or other user interface components. Some or all of these objects may be focusable (i.e., programmed to receive and act on keyboard input). As depicted, user interface 200 comprises workspace pane 202; channel list pane 204, which comprises channel list 206 and direct message list 208; channel pane 210, which comprises channel header 212, channel controls 214, channel display 218, messages 220, and thread reply preview 222; search pane 216; compose pane 224; and thread pane 226, which comprises thread header 228, thread display 230, and thread compose pane 232. In some embodiments, users can interact with these panes and other objects (either via their keyboard, pointing device such as a mouse, or both) to navigate and utilize the various functions available within the group-based communication system.

As depicted, user interface 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Development. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme software development projects, a workspace for Human Resources, and an additional workspace for general company matters. In some embodiments, workspaces can be associated with one or more organizations or other entities associated with the group-based communication system.

As depicted, user interface 200 further comprises channel pane 210 that displays information related to the currently displayed channel. In some embodiments, within the group-based communication system, communication may be organized into "channels," each channel dedicated to a particular topic or set of users. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing in order to see only those messages relevant to the topic of that channel without seeing messages posted in other channels on different topics. Channel pane 210 may comprise channel header 212, channel controls 214, channel display 218, and compose pane 224. Scrollable channel display 218 may display all of the content transmitted via the channel including, but not limited to, messages 220 and thread reply previews 222. Users may navigate between channels using channel list pane 204. For example, if the focus is currently in the channel list pane, the Up Arrow and Down Arrow keys may move an indicator (such as a highlight) up and down in the list of channels, and the Enter key may cause the selected channel to be displayed in channel pane 210. Alternatively, the user may click on a desired channel using a pointing device in order to cause that channel to be displayed in channel pane 210. Channel list pane 204 may comprise a list of channels to which the user has subscribed to or to which the user has been granted access.

In some embodiments, channel list pane 204 further includes direct message list 208. Direct message list 208 comprises a list of messages sent from a user directly to another user of the group-based communication system, which may be displayed in channel pane 210 when selected. Direct messages may be sent to one other user or more than one other user. For example, the user may have a question for their manager, so the user may send a direct message to the manager asking the question. The manager may want to include another member of the group-based communication system in a response, so the manager may create a direct message group that includes the user and the other member of the group-based communication system. Direct messages may be sent to any number of users.

In some embodiments, conversations in channels may further be broken out into threads. Threads may be used to avoid cluttering a channel with conversation unrelated to the main channel topic. For example, a user, C. Smith, in the channel #proj-1 may ask a question pertaining to a specific test that needs to be conducted. Another member of the channel may decide to reply to the user in a thread to keep the conversation grouped together and to keep the response from getting lost in the channel. Under the message to which a user has replied appears thread reply preview 222. Thread reply preview 222 may show information related to the thread, such as, for example, the number of replies and the members who have replied. Thread replies may appear in thread pane 226 that may be separate from channel display 218 in channel pane 210 and may be viewed by other members of the channel by selecting thread reply preview 222 in channel display 218.

In some embodiments, thread pane 226 includes thread header 228 that may display the channel the thread is associated with. Thread pane 226 also may include scrollable thread display 230 that displays each message sent in the history of the thread. Users participating in the thread may also reply directly to the thread using thread compose pane 232. Thread compose pane 232 may be positioned within thread pane 226 where a user can compose and transmit a reply to the messages in the thread.

Channel pane 210 may also include channel header 212, which may display metadata for the currently selected channel, including channel name, channel membership, and channel topic. Channel header 212 may also display channel controls 214 for viewing members of the channel, inviting a new member to the channel, viewing information about the channel, or other channel-related functions.

User interface 200 may also include search pane 216. Search pane 216 may allow users to search for content located in the current workspace of the group-based communication system. For example, a user may be looking for a file that was sent in a channel previously. The user may not remember which channel the file was sent in or when the file was sent, so the user may search for the file name in search pane 216. Users are not limited to searching for only files and may also search for messages, channels, members, and the like.

As previously mentioned, channel pane 210 may also include compose pane 224. Compose pane 224 allows users to compose and transmit messages to the members of the channel. Compose pane 224 may have text editing functions such as bold, strikethrough, and italicize. Compose pane 224 may also allow users to format their messages or attach files such as, but not limited to, document files, images, videos, or any other files to share the file or files with other members of the channel. As depicted, compose pane 224 currently has the keyboard focus, as indicated by the bolded box. Many various techniques for visually indicating a highlighted component are contemplated, including highlighting the focused object, de-highlighting or fading unfocused objects, and changing the color of the focused object. A person of ordinary skill, upon reviewing this disclosure, will appreciate that many such visual indications can be utilized with embodiments of the invention. Broadly speaking, the focused object (such as a pane, window, component, text box, image, or window) is the object to which keystrokes will be directed. For example, if the compose pane is focused (as depicted), keystrokes typed by the user will appear as the text of a message which can be posted to the current channel displayed in channel pane 210.

Certain keystrokes or keystroke combinations may be instead interpreted as commands. As used herein, the term "keystroke" refers to pressing a single key on a keyboard, while the term "keystroke combination" refers to pressing one or more keys while holding down one or more modifier keys such as Command, Control, Alt, or Function. A person of ordinary skill will appreciate that many such modifier keys exist, and all such keys are contemplated as being usable with embodiments of the present invention. For brevity, this disclosure uses the term "keystroke," but it should be appreciated that a keystroke combination can be used in place of any keystroke unless specifically noted otherwise. For example, if the user presses the Control+B keystroke combination while compose pane 224 is focused, that may toggle the entry of bold text. The operation of command keystrokes may vary depending on the focused object. For example, the Delete key may cause a single character to be deleted if compose pane 224 is focused but cause the deletion of a user's previous message 220 if that message 220 is focused. Command keystrokes when one object is focused may be interpreted as text-entry keystrokes if a different object is focused. For example, the 'e' key may cause an "e" to be added to the message currently being composed if compose pane 224 is focused but enter editing mode for a user's previous message 220 if that message 220 is focused.

Within the set of command keystrokes, certain keystrokes may be interpreted as navigation keystrokes. For example, if the user presses the Up Arrow key, that may cause focus to be shifted to thread reply preview 222 or to the closest message 220. As used herein, the term "navigation keystrokes" refers to a keystroke or combination of keystrokes that causes the focus to shift to a different object in user interface 200. For example, in some embodiments, the Up Arrow, Down Arrow, Left Arrow, Right Arrow, keystrokes may be defined as navigation keystrokes, causing focus to shift to an adjacent object in the corresponding direction from the currently focused object. In some embodiments, the Tab keystroke and the Shift+Tab keystroke combination may also be defined as navigation keystrokes, causing focus to cycle through the various focusable objects in user interface 200 forward and backward in a predetermined order. In some embodiments the F6 key and the Shift+F6 key combination may also be defined as navigation keys, causing focus to cycle between the various sections of user interface 200 forward and backward in a predetermined order.

Figure 2B:
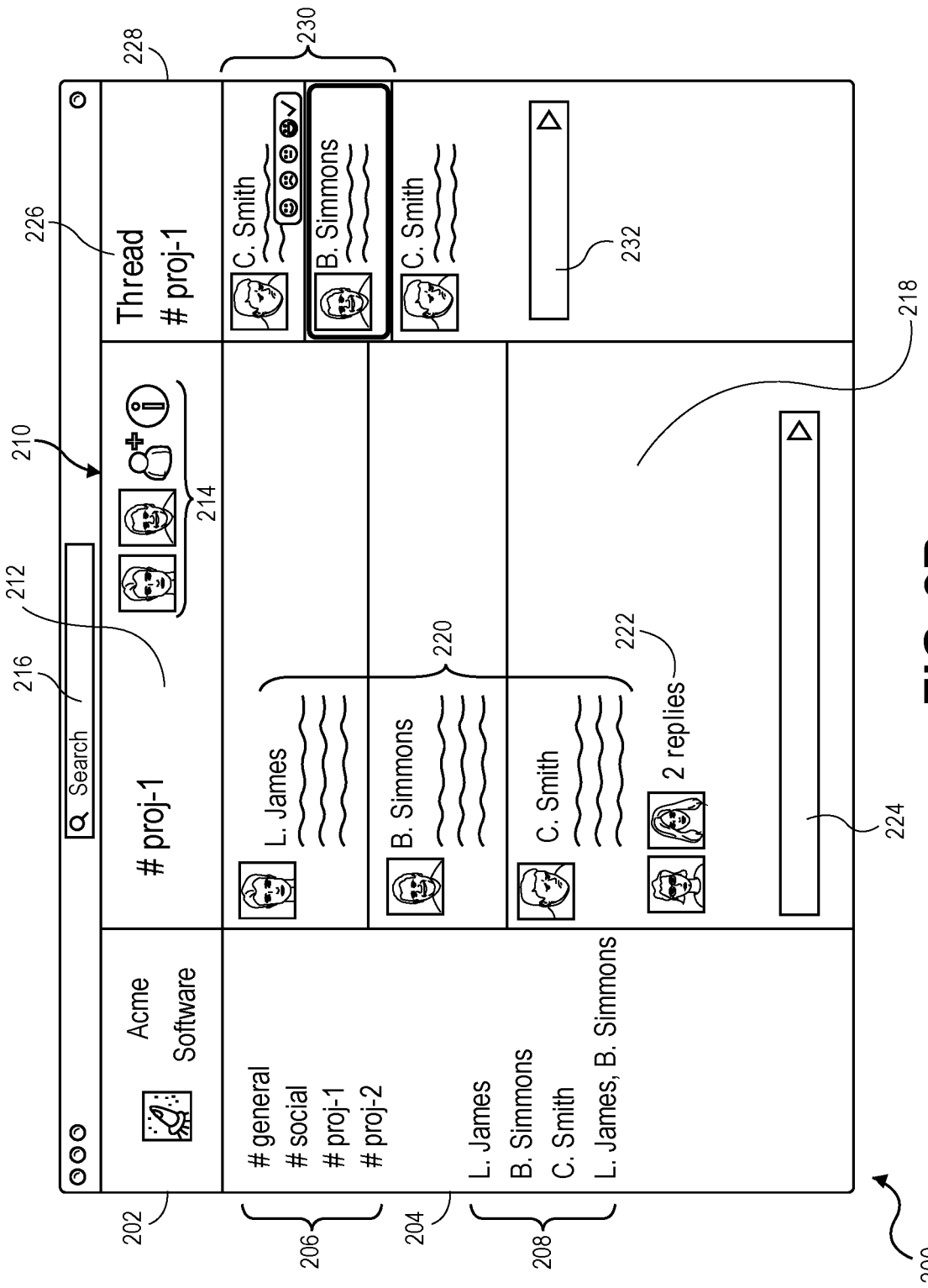
FIG. 2B depicts the user interface of FIG. 2A after the user has changed focus to the thread display.

Continuing the example of FIG. 2A, FIG. 2B depicts user interface 200 after the user has changed focus to thread display 230, either by clicking in thread reply preview 222 or by using navigation keystrokes. By contrast with compose pane 224, the thread display 230 is not a text entry component and, as such, keystrokes entered by the user will be interpreted differently. For example, as described above, the 'e' key will enter editing mode for the message (assuming the user has the permissions to do so), and the Delete key will cause the message to be deleted (again, assuming the user has permissions to do so).

Figure 2C:
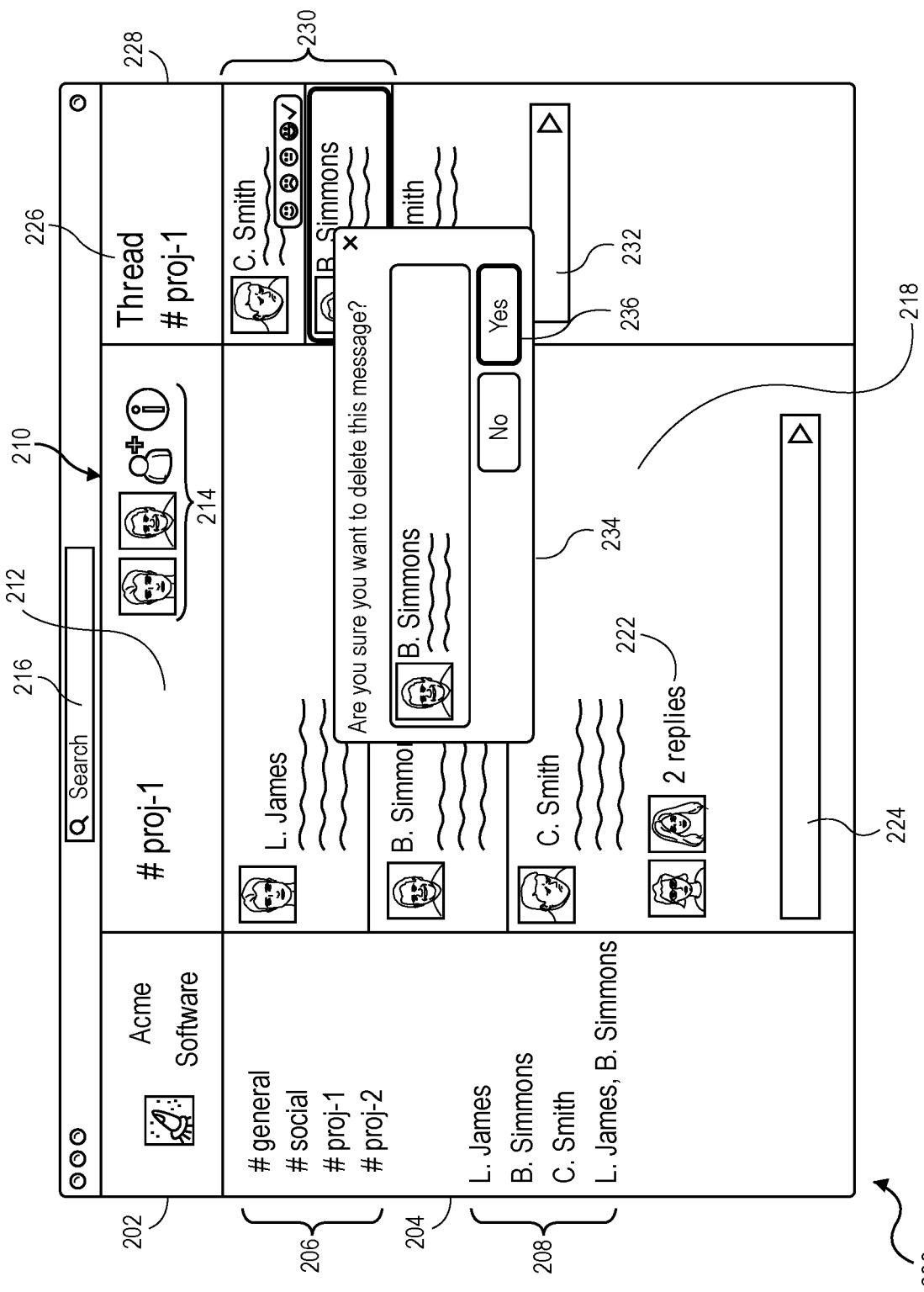
FIG. 2C depicts the user interface of FIGS. 2A and 2B after the user has pressed the Delete key to delete the focused message.

Continuing the example of FIGS. 2A and 2B, FIG. 2C depicts user interface 200 after the user has pressed the Delete key to delete the focused message. As a result of the user instructing deletion of the focused message, confirmation window 234 is displayed and automatically becomes focused. In this instance, the Delete key operated as a contextual navigation key (because it caused the focused element to change) based on the context, as distinct from a universal navigation keystroke, which will cause focus to change regardless of the current context. As depicted, the "Yes" button 236 of confirmation window 234 is the focused object by default when confirmation window 234 is instantiated, such that pressing Enter will select the "Yes" option and confirm deletion. However, there may be a brief interval between the user pressing the Delete key and the instantiation of confirmation window 234. In prior systems, if the user pressed Enter during this interval, the keystroke could be lost, or mistakenly directed to thread display 230. As described below, embodiments of the invention ensure that this keystroke is delivered to the correct object regardless of when it arrives.

Furthermore, once the user selects an option in confirmation window 234 (either by using keyboard commands or a pointing device), confirmation window 234 is dismissed and can therefore no longer be focused. In such a scenario, a new focus window must be determined. In some embodiments, focus may return to the window that had focus prior (in this example, to thread display 230, which had focus prior to confirmation window 234). In other embodiments, the object being closed may specify a new object to receive focus. In still other embodiments, focus might always return to a predetermined top-level object (for example, channel pane 210) or a default object based on a current URL associated with the updated application view when the currently focused object is closed. As another example, focus may be contextually determined. For example, if the user is currently viewing a channel (with the focus being in the compose pane) and they press the Up Arrow key, focus may transition to the most recently posted message 220. However, if the most recently posted message 220 corresponds to a message of a thread, then focus may instead transition to the most recently posted message in thread display 230. Each of these options is discussed in greater detail below with respect for FIG. 4.

Figure 3A:
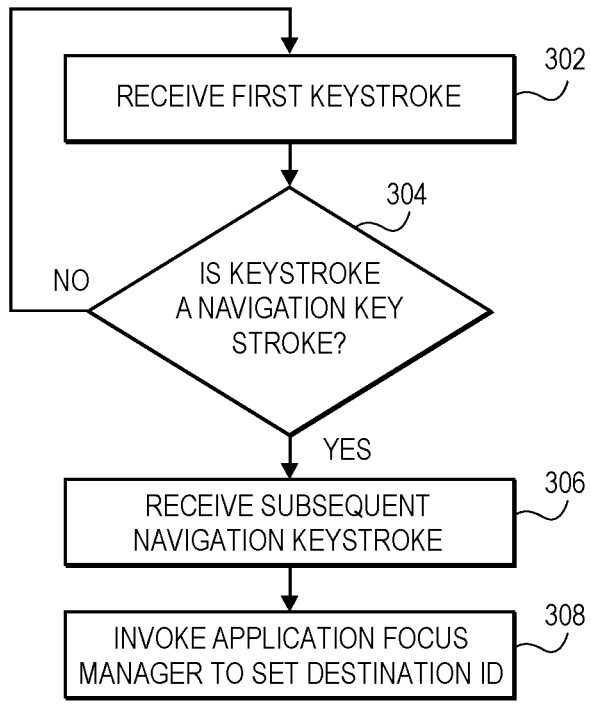
FIG. 3A depicts a flowchart illustrating the operation of a method for sending the focus using a focus transition manager in accordance with embodiments of the present invention.

FIG. 3A depicts a flowchart illustrating the operation of a method for sending the focus using a focus transition manager in accordance with embodiments of the present invention. In discussing the operation of the focus transition manager, reference is made to FIG. 4 below, where the operation of the individual components is discussed in additional detail. Initially, at step 302, the sending object (such as, for example, first object 402 in FIG. 4) receives a keystroke from the user. Broadly speaking, this keystroke may be a universal navigation keystroke, a contextual navigation keystroke, a non-navigation command keystroke, or a text-input keystroke, and the type of keystroke may depend on the type of the sending object. For example, the 'e' keystroke may be either a text-input keystroke (if the currently focused object is a text-entry field) or a command key (if the currently focused object is an editable message previously authored by the user). Alternatively, in some embodiments, certain keystrokes may have no effect.

Next, at step 304, the received keystroke is categorized as being a navigation keystroke or a non-navigation keystroke. In some embodiments, only a predefined set of universal navigation keystrokes are considered navigation keystrokes for the purposes of step 304. In other embodiments, any keystroke that operates as a contextual navigation keystroke may be considered a navigation keystroke for the purposes of step 304. In still other embodiments, a contextual navigation keystroke is considered a navigation keystroke for the purposes of step 304 only if it operates as a navigation keystroke in the context of the currently focused object. Regardless of the specific criterion used, if the keystroke is categorized as being a navigation keystroke, processing proceeds to step 306; otherwise processing returns to step 302 to await another keystroke.

At step 306, a subsequent navigation keystroke is received. Broadly, this keystroke need not be received immediately after the first keystroke received at step 302; rather, any number of non-navigation keystrokes may be received between step 304 and step 306, and an arbitrary amount of time may pass. In some embodiments, the navigation keystroke received at step 306 may be any keystroke that generates a focus change. For example, pressing the Escape key may cause a focus transition if the current object is a modal dialog. In some embodiments, step 306 can be omitted, and processing can proceed directly to step 308 from step 304 so as to invoke the focus transition manager 406 directly in response to the navigation keystroke received at step 302. In other embodiments, multiple consecutive navigation keystrokes are required before any navigation keystroke causes the focus transition manager 406 to be invoked.

Figure 4:
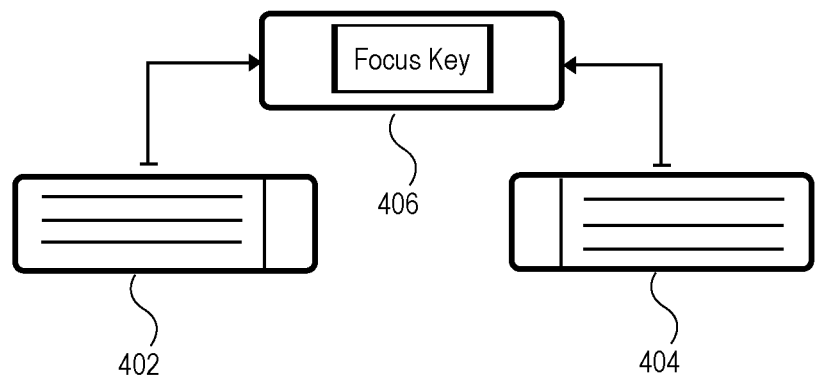
FIG. 4 depicts the operation of a focus transition manager in accordance with embodiments of the invention.

Next, at step 308, the currently focused object invokes focus transition manager 406 with a "focusKey" parameter which is indicative of the object which should receive the focus (such as, for example, second object 404 in FIG. 4). The focusKey parameter is discussed in additional detail below with respect to FIG. 4. This invocation may be via a method of focus transition manager 406 such as the transitionFocusTo( ) method (also described below with respect to FIG. 4). The object which should receive focus may be determined based on the navigation key and a structure such as a Document Object Model (DOM) (for example, by looking at a previous item in a list node containing the currently focused object in response to an Up Arrow key), based on the navigation key alone (for example, it might be that the Alt+Home keystroke combination unconditionally returns focus to channel pane 210), or based on context received when the currently focused object received focus (for example, a particular modal dialog may return focus to the previously focused object when it is closed for any reason). As discussed above with respect to FIG. 4, a context blob and/or a force flag (discussed in additional detail below) may optionally be included with the invocation, to provide additional data to the newly focused object and/or to skip the focus mode check described above with respect to FIG. 5, respectively. In some embodiments, the invocation of focus transition manager 406 may include a timeout, such that, if the destination object does not claim the keyboard focus with a predetermined time period, keyboard focus returns to the sending object. In various embodiments, this time period may be 500 ms, 1 second, 2 seconds, 3 seconds, 5 seconds, or any other time period.

Figure 3B:
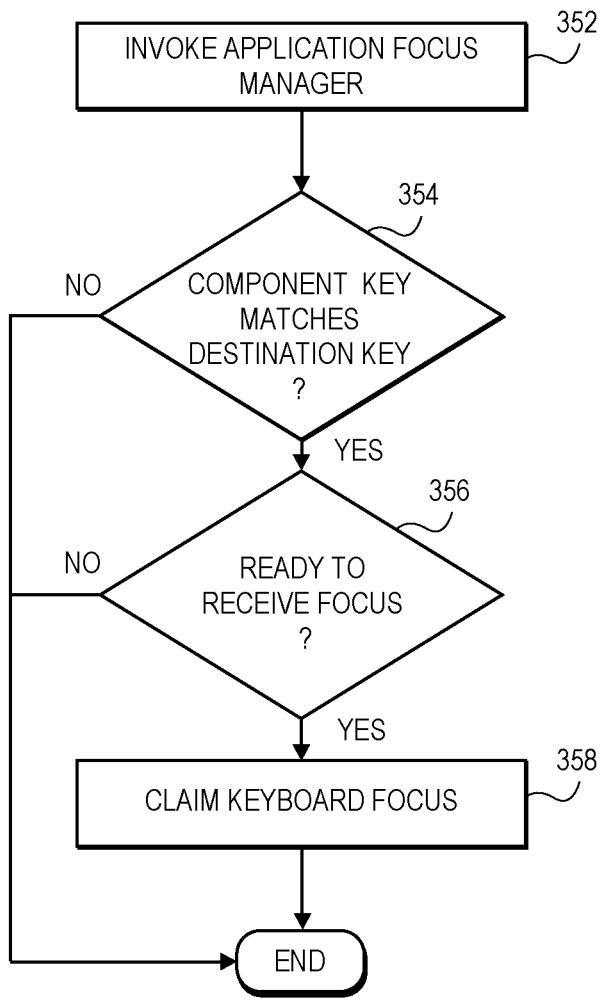
FIG. 3B depicts a flowchart illustrating the operation of a method of claiming the focus via a focus transition manager in accordance with embodiments of the present invention.

FIG. 3B depicts a flowchart illustrating the operation of a method of claiming the focus of the application via a focus transition manager in accordance with embodiments of the present invention. The method of FIG. 3B could be performed in response to a previous operation of the method of FIG. 3A or independently. For example, the method of FIG. 3B could be performed automatically in response to detecting that a Uniform Resource Locator (URL) associated with a current application view has changed. Initially, at step 352, the receiving object invokes focus transition manager 406 with its own component identifier "myFocusKey" (discussed below with respect to FIG. 4), which uniquely identifies the receiving object for the purpose of focus transitions. This invocation may be via an Application Programming Interface (API) of focus transition manager 406 such as the shouldTransitionFocus( ) method described below. This invocation may be the result of a publication/subscription architecture, whereby the receiving object is notified any time focus transition manager 406 (or the previously focused object) announces that a focus transition should occur. Alternatively or in addition, a newly created object may invoke the focus transition manager 406 at the conclusion of its instantiation and/or initialization process once it is ready to receive focus.

Next, at step 354, the component's myFocusKey is compared to the destination focusKey provided to focus transition manager 406 at step 308. In some embodiments, this comparison is performed by focus transition manager 406, and the result provided to the receiving object. In other embodiments, no result is provided to the receiving object until after both step 354 and steps 356 have been performed. In still other embodiments, a negative response is provided immediately to the receiving object if the component's myFocusKey does not match the destination focusKey, but a positive response is not provided until and unless both steps 354 and 356 succeed. If the component's myFocusKey does not match the destination focusKey, processing terminates after any necessary return value is provided; otherwise, processing proceeds to step 356.

At step 356, it is determined whether the receiving component is ready to receive focus. In some embodiments, the receiving object makes this determination after it receives a positive response to block 354. In other embodiments, this determination is made by focus transition manager 406 using, for example, a function provided by the receiving object as a parameter to the shouldTransitionFocus( ) method call, as described below. In some embodiments or for some invocations of focus transition manager 406, block 356 may be skipped and processing may proceed directly from step 354 (in the event of a positive result) to step 358. If the receiving component is not yet ready to receive focus, processing terminates after any necessary return value is provided; otherwise, processing proceeds to step 358.

At step 358, the receiving object claims the keyboard focus and begins receiving any keystrokes entered by the user. This may be achieved using, for example, a this.focus( ) method call. For the sake of clearly illustrating the operation of the focus transition manager, additional tests for determining whether the system is in keyboard navigation mode or pointing device navigation mode (and, in the case of pointing device navigation mode, whether a force flag has been provided) have been omitted. A person of skill, having reviewed this disclosure, will appreciate how such tests can be incorporated into the flow of FIG. 3B.

FIG. 4 depicts the operation of focus transition manager 406 in accordance with embodiments of the invention. Broadly speaking, when a first object 402 and sends focus to a second object 404, focus transition manager 406 intermediates the process to ensure that focus is transitioned correctly. In prior systems, first object 402 directly invokes second object 404 to set focus. For example, where the prior system is implemented using JavaScript to manipulate a Document Object Model (DOM), the first object can search the DOM to obtain a reference to the desired object to focus, and then invoke a focus( ) method for that object. However, the sub-object of the second object which should ultimately receive focus (for example, a text box inside a newly created window of the second object) may not yet exist, or the component may otherwise not be ready to receive focus. In such a case, one or more keystrokes may not be directed or the correct component or may even be incorrectly delivered to the first object. For example, a user may be using keyboard navigation to move backward through messages 220 in channel display 218 to locate a message to delete. If these messages are lazily loaded via a network, the message intended for deletion may still be in the instantiation process when the user reaches it and pressed the Delete key. If this key is delivered before focus is properly transitioned, it may cause an incorrect message to be deleted.

Similarly, a particular dialog may be opened from a number of different calling points (e.g., from a number of different buttons in user interface 200), and the dialog may set the focus differently depending on user input. For example, if the user cancels the dialog, focus may need to be returned to the button that opened the dialog; on the other hand, if the user opens a new user object (such as a new pane or a different modal dialog) from the dialog, the focus may need to be directed to the newly created object. Without creating ad-hoc solutions to determine a focus target for each dialog and other object in the application, it may be impossible to direct the focus correctly.

Focus transition manager 406 provides an API, which can be invoked by focusable objects in the application. In some embodiments, the API provided by focus transition manager 406 includes a first function allowing a currently focused object to send focus to an identified destination object. In some embodiments, the API to send focus to an identified destination object includes a function "transitionFocusTo( )" which takes a parameter referred to herein as "focusKey" identifying the destination object.

In some embodiments, the transition FocusTo( ) method can be invoked with an optional parameter indicating context for the object receiving focus. For example, the context parameter may be a JavaScript Object Notation (JSON) blob or other data structure providing arbitrary information for use by second object 404. For example, a search pane 216 may focus channel pane 210 when the user selects a particular search result to view that result in context. In such a scenario, the context information could indicate sub-element (such as a particular channel identifier and/or message) identifier to allow channel pane 210 to jump to the selected result in context when it claims focus. Alternatively, instead of providing an identifier for a specific massage or channel, predefined pseudo-selector values such as "selector: 'lastVisibleMessage'," "selector: 'mostRecentMessage'," or "selector: 'firstMessage'," may be used to identify the sub-element without requiring the use of particular, unique identifiers. In such cases, the receiving object is responsible for determining the identity of the sub-element based on the pseudo-selector provided by the sending object.

In another embodiment of context provided by the sending object, first object 402 may create, as second object 404, a modal dialog which should return focus to first object 402 when it closes. In such a scenario, the context data can provide a "returnFocusTo: this.focusKey" key-value pair so that the modal dialog can correctly invoke the transitionFocusTo( ) method using the value provided for the returnFocusTo key when the modal dialog closes. In this way, the same type of modal dialog can be reused in multiple places and return focus to the appropriate object regardless of which object created it.

In some embodiments, the API provided by focus transition manager 406 further includes a second function allowing an unfocused object to determine whether it should claim focus in response to an indication of a focus transition. This disclosure refers to this function as "shouldTransitionFocus( )" which (in some embodiments) takes a parameter referred to herein as "myFocusKey" identifying the invoking object. Responsive to an invocation of shouldTransitionFocus( ) the focus transition manager can compare the provided myFocusKey to the focusKey provided when the previously focused object invoked the transition FocusTo( ) function and return an appropriate value (for example, a Boolean "true" value if myFocusKey matches focusKey, and a Boolean "false" value otherwise. Thus, each focusable object in the user interface may invoke the shouldTransitionFocus( ) method of the focus transition manager with its own myFocusKey in response to a focus transition, and only for the intended focus target will a positive response be returned.

In embodiments where first object 402 can provide additional context for second object 404, focus transition manager 406 may clean up the appropriate context once it has been received by second object 404. This clean-up may include, for, example, deallocating the memory used to store the context. However, as described elsewhere, second object 404 may not be immediately available to receive focus from first object 402 when the focus transition occurs and it initially invokes shouldTransitionFocus( ) even if the invoking object is the intended destination object. For example, if a thread is in the loading state because the replies are still being fetched, then thread display 230 may wait until the replies are available before it claims the focus. Thus, the intended destination object may call the shouldTransitionTo( ) function multiple times: first, in response to the notification of the focus transition, and later when it is actually ready to claim the focus. However, if focus transition manager 406 immediately cleans up the context when the shouldTransitionFocus( ) method is invoked by second object 404 the first time, the context will be cleaned up (and will be therefore unavailable) on a subsequent invocation, when second object 404 is actually ready to claim focus.

To address this problem of memory lifetime for the provided context, in some embodiments, second object 404 can provide an optional parameter to function shouldTransitionFocus( ) in the form of a "ready" function (such as, for example, an anonymous function). The ready function, when evaluated by function transition manager 406 after second object 404 invokes the shouldTransitionFocus( ) method, indicates whether second object 404 will actually be ready to claim focus if it is the intended focus target. If the focusKey provided by first object 402 matches the myFocusKey provided by second object 404 when second object 404 invokes shouldTransitionFocus( ) but the ready function provided by second object 404 returns a negative result, function transition manager 406 knows that second object 404 is not ready and can maintain the context. Then, on a subsequent invocation by second object 404, if the focusKey provided by first object 402 matches the myFocusKey provided by second object 404 and, additionally, the ready function returns a positive result (indicating that second object 404 is available to claim focus), the context can be then cleaned up.

As discussed in further detail below, in some embodiments, the focus transition manager is only used when the user is using keyboard navigation. In some embodiments, first object 402 can invoke the transitionFocusTo( ) method with an optional 'forceFocus' flag (or "force" flag), causing the focus transition manager 406 to be used to manage focus even if the user is using pointing device navigation mode. For example, if a composer view window is created with the input to compose a message, then it may be desirable to unconditionally transition the focus to the newly created compose window, even if the user is in pointing device navigation mode.

In some embodiments of the process of transitioning focus, first object 402 calls focus transition manager 406 with the focusKey parameter indicating a unique identifier for the object that should receive focus. For example, focus transition manager 406 might have a method transitionFocusTo(focusKey), which can be invoked by an object transitioning focus to a different object identified by the focusKey. Upon invocation, focus transition manager 406 stores the received focusKey for later use. In some embodiments, as described below, first object 402 provides an additional context object in the transitionFocusTo( ) method, which can be provided to second object 404 when it receives focus. In some embodiments, first object 402 can close or otherwise de-focus itself while causing keystrokes to be buffered such that they can be delivered to the second object 404 when it claims focus.

The object receiving focus (here, second object 404) can subsequently invoke a corresponding method of focus transition manager 406 with its own unique identifier. For example, focus transition manager 406 may include the method shouldTransitionFocus( ) described above. If the shouldTransitionFocus( ) method returns true when invoked by second object 404 (thus indicating that second object 404 is the intended focus target), then the object receiving focus (here, second object 404) can invoke a focus( ) method on itself directly. This process is described in additional detail with respect to FIG. 3B. In some embodiments, a publish/subscribe model is employed to notify focusable objects that a focus transition is occurring and that they should each invoke the shouldTransitionFocus( ) method to see if they are the intended focus target. In other embodiments, other techniques for inter-object communication can be used to notify focusable objects that they should each check to see if they are the target of a focus transition. It is an advantage of the invention that second object 404 need not immediately claim focus. For example, if second object 404 is still in the process of initializing itself, it can wait to check it should claim focus until the initialization process is complete. Alternatively, second object 404 can invoke the shouldTransitionFocus( ) method, determine that it is the target of the focus transition, determine that it is not ready to receive focus, and ignore the focus transition focus until the initialization process is complete. In some embodiments, objects may invoke the shouldTransitionFocus( ) method (potentially for the second time) as a final step in their initialization process to determine if they were created and immediately focused.

Figure 5:
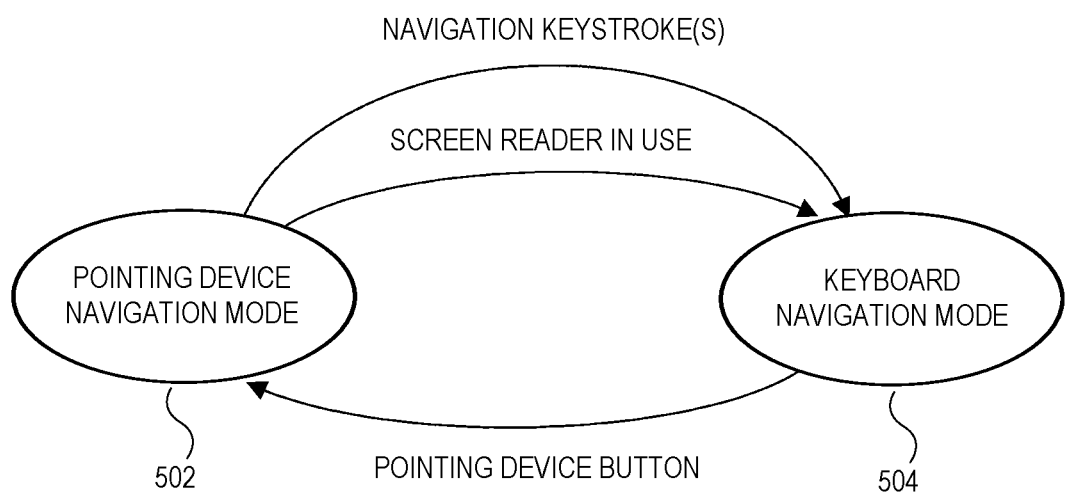
FIG. 5 depicts a state transition diagram showing an exemplary method of transitioning between a keyboard navigation mode and a pointing device navigation mode.

FIG. 5 depicts a state transition diagram showing an exemplary method of transitioning between a keyboard navigation mode and a pointing device navigation mode. In some embodiments, the focus transition manager described above with respect to FIG. 4 is invoked only when the user is currently making use of the keyboard to navigate the current application. As the same user may switch back and forth between keyboard navigation and pointing device navigation repeatedly, it is desirable to track a current navigation mode to determine whether the focus transition manager should be invoked. As depicted, the system moves between pointing device navigation mode 502 and keyboard navigation mode 504 based on detected user behaviors, and the user need not manually specify a navigation mode.

Broadly speaking, in pointing device navigation mode 502, the user is navigating the application using a pointing device such as a mouse, track ball, trackpad, stylus, or touch screen. In pointing device navigation mode, keyboard focus is managed according to a conventional focus paradigm provided by the application, the browser, the windowing system, or the operating system. For example, the pointing device navigation mode may be focus-follows-mouse, click-to-focus, or sloppy focus. In embodiments distinguishing between keyboard focus mode and pointing device navigation mode, focus transition manager 406 will generally be inactive while the user is in pointing device navigation mode 502. This can be implemented, for example, by causing the shouldTransitionFocus( ) function described above to always return the Boolean value false whenever it is invoked (even if the provided myFocusKey matches the stored focusKey), thereby allowing focus to remain with the pointing device cursor. As described above, the optional 'force-Focus' flag can override this behavior, allowing (for example) newly created windows to be focused without requiring the user to move the mouse cursor to focus them. By contrast, in keyboard navigation mode 504, focus transition manager 406 will be active as described above with respect to FIG. 4. In this way, focus can be managed in accordance with the user's intuitive expectations while still maintaining the improved functionality of managed focus transitions as described above.

The system may begin in either pointing device navigation mode 502 or keyboard navigation mode 504. As depicted, the mode can transition back and forth between these two modes as the user interacts with the application. In particular, if the system is in keyboard navigation mode 504 and the user interacts with the pointing device (by, for example, pressing a mouse button or moving the mouse enough that it would trigger a focus transition), the system transitions to pointing device navigation mode 502. Conversely, if the system is in pointing device navigation mode 502 and the user presses one of a predefined set of navigation keys (such as, for example, the Tab key or one of the Arrow keys), the system transitions to pointing device navigation mode 502. Furthermore, in some embodiments, the application may be able to detect that the user is using a screen reader in conjunction with the application. This may be the case, for example, where the application is a locally installed web application built using a framework such as Electron. The use of a screen reader may be interpreted as a reliable indicator that the user will rely on keyboard navigation (for accessibility reasons) and cause the system to switch into keyboard navigation mode 504. This may be particularly useful where, for example, the system starts in pointing device navigation mode 502, allowing the system to immediately transition to keyboard navigation mode 504 without requiring a navigation keystroke to trigger the switch.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media storing computer-executable instructions that, when executed by at least one processor, perform a method of managing focus for an application comprising a plurality of application user interface (UI) components, the method comprising:
   receiving, by a first UI component in the plurality of application UI components, a first keystroke in a predefined set of navigation keystrokes;
   responsive to receiving the first keystroke, transitioning to a keyboard navigation mode;
   receiving, by the first UI component, a second keystroke in the predefined set of navigation keystrokes;
   responsive to receiving the second keystroke, invoking, by the first UI component, an application focus manager to set a destination UI component identifier indicative of a UI component to receive a keyboard input focus;
   retrieving, by the application focus manager, the destination UI component identifier;
   determining whether the destination UI component identifier matches a UI component identifier associated with a second UI component;
   upon determining that the destination UI component identifier matches the UI component identifier associated with the second UI component, providing, to the application focus manager and by the second UI component, a parameter indicating a state of the second UI component to the application focus manager; and
   upon determining that the parameter indicates the state is not a ready state, re-invoking the application focus manager, by the second UI component, to determine if the parameter indicates the state is the ready state; and
   upon determining that the parameter indicates the state is the ready state, updating the keyboard input focus to the second UI component,
   wherein the ready state is indicative that the second UI component is ready to claim the keyboard input focus.

2. The non-transitory computer-readable media of claim 1, wherein invoking the application focus manager to set the destination UI component identifier further comprises a step of providing, to the application focus manager, additional context data for the second UI component.

3. The non-transitory computer-readable media of claim 2, wherein the method further comprises storing, by the application focus manager, the additional context data and the destination UI component identifier.

4. The non-transitory computer-readable media of claim 1, wherein the first UI component is distinct from the second UI component.

5. The non-transitory computer-readable media of claim 1, wherein the application focus manager is configured to programmatically determine whether an invoking UI component should be focused based on a match between a provided component UI identifier and the destination UI component identifier.

6. The non-transitory computer-readable media of claim 5, wherein the application focus manager programmatically determines whether the invoking UI component should be focused based on the keyboard navigation mode.

7. The non-transitory computer-readable media of claim 1, wherein the second UI component invokes the application focus manager with the UI component identifier associated with the second UI component.

8. A method of managing focus for an application comprising a plurality of application user interface (UI) components, the method comprising:
    receiving, by a first UI component in the plurality of application UI components, a first keystroke in a predefined set of navigation keystrokes;
    responsive to receiving the first keystroke, transitioning to a keyboard navigation mode;
    receiving, by the first UI component, a second keystroke in the predefined set of navigation keystrokes;
    responsive to receiving the second keystroke, invoking, by the first UI component, an application focus manager to set a destination UI component identifier indicative of a UI component to receive a keyboard input focus;
    retrieving, by the application focus manager, the destination UI component identifier;
    determining whether the destination UI component identifier matches a UI component identifier associated with a second UI component;
    upon determining that the destination UI component identifier matches the UI component identifier associated with the second UI component, providing, to the application focus manager and by the second UI component, a parameter indicating a state of the second UI component to the application focus manager;
    upon determining that the parameter indicates the state is not a ready state, re-invoking the application focus manager, by the second UI component, to determine if the parameter indicates the state is the ready state; and
    upon determining that the parameter indicates the state is the ready state, updating the keyboard input focus to the second UI component,
    wherein the ready state is indicative that the second UI component is ready to claim the keyboard input focus.

9. The method of claim 8, wherein invoking the application focus manager to set the destination UI component identifier further comprises providing, to the application focus manager, additional context data for the second UI component.

10. The method of claim 9, further comprising storing, by the application focus manager, the additional context data and the destination UI component identifier.

11. The method of claim 8, wherein the first UI component is distinct from the second UI component.

12. The method of claim 8, wherein the application focus manager is configured to programmatically determine whether an invoking UI component should be focused based on a match between a provided UI component identifier and the destination UI component identifier.

13. The method of claim 12, wherein the application focus manager programmatically determines whether the invoking UI component should be focused based on the keyboard navigation mode.

14. The method of claim 8, wherein the second UI component invokes the application focus manager with the UI component identifier associated with the second UI component.

15. A system comprising at least one processor and at least one non-transitory memory storing computer executable instructions that when executed by the at least one processor cause the system to carry out actions comprising:
    receiving, by a first user interface (UI) component in a plurality of application UI components, a first keystroke in a predefined set of navigation keystrokes;
    responsive to receiving the first keystroke, transitioning to a keyboard navigation mode;
    receiving, by the first UI component, a second keystroke in the predefined set of navigation keystrokes;
    responsive to receiving the second keystroke, invoking, by the first UI component, an application focus manager to set a destination UI component identifier indicative of a UI component to receive a keyboard input focus;
    retrieving, by the application focus manager, the destination UI component identifier;
    determining whether the destination UI component identifier matches a UI component identifier associated with a second UI component;
    upon determining that the destination UI component identifier matches the UI component identifier associated with the second UI component, providing, to the application focus manager and by the second UI component, a parameter indicating a state of the second UI component to the application focus manager;
    upon determining that the parameter indicates the state is not a ready state, re-invoking the application focus manager, by the second UI component, to determine if the parameter indicates the state is the ready state; and
    upon determining that the parameter indicates the state is the ready state, updating the keyboard input focus to the second UI component, wherein the ready state is indicative that the second UI component is ready to claim the keyboard input focus.

16. The system of claim 15, wherein invoking the application focus manager to set the destination UI component identifier further comprises providing, to the application focus manager, additional context data for the second UI component.

17. The system of claim 16, wherein the actions further comprise storing, by the application focus manager, the additional context data and the destination UI component identifier.

18. The system of claim 15, wherein the first UI component is distinct from the second UI component.

19. The system of claim 15, wherein the application focus manager is configured to programmatically determine whether an invoking UI component should be focused based on a match between a provided component UI identifier and the destination UI component identifier.

20. The system of claim 15, wherein the second UI component invokes the application focus manager with the UI component identifier associated with the second UI component.

* * * * *